Figure 1:
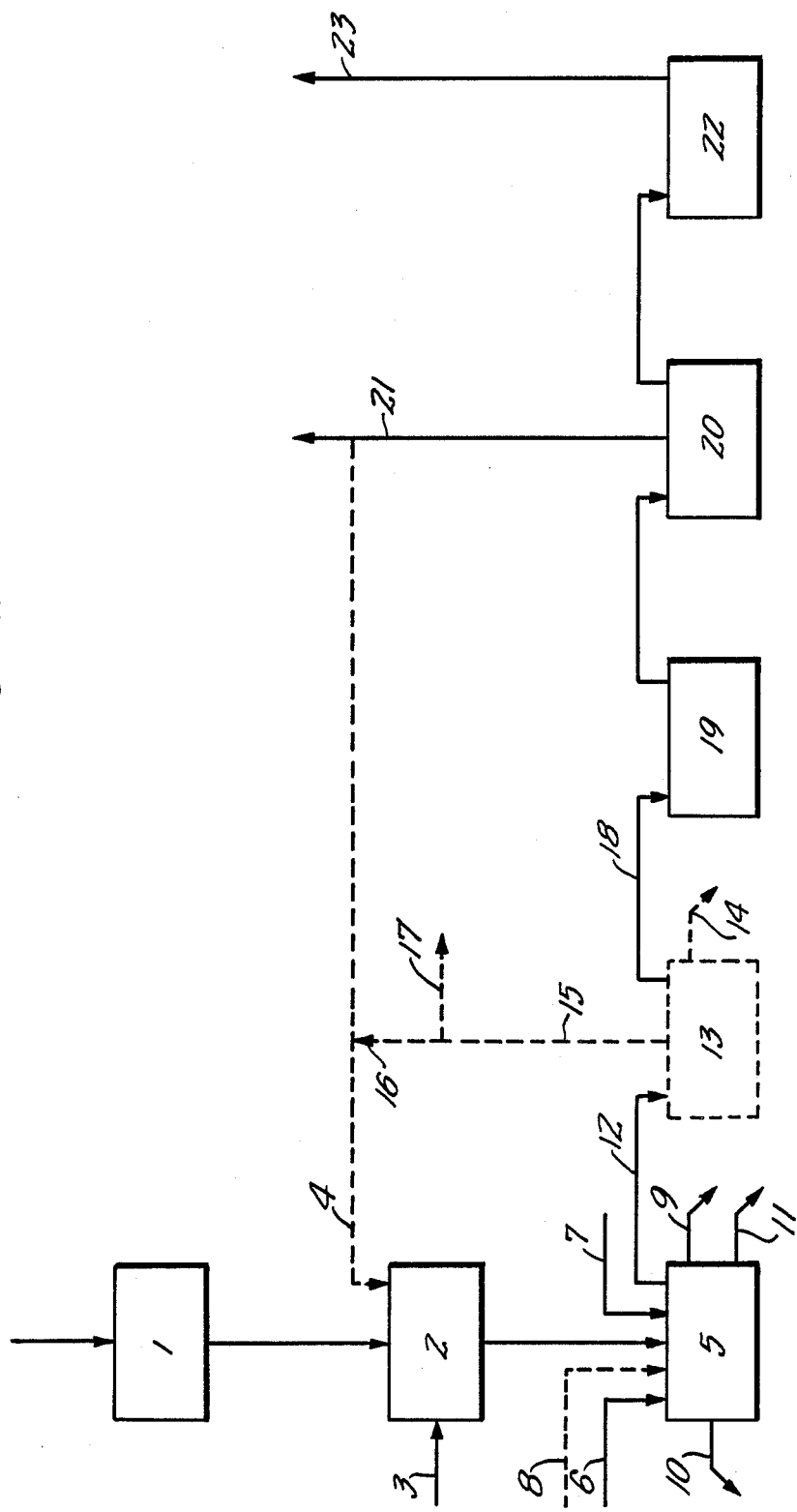

United States Patent [19]

Aune

[11] Patent Number: 4,831,943
[45] Date of Patent: May 23, 1989

[54] TREATING ASH AND DUST FROM INCINERATION PLANTS BY COPROCESSING WITH HAZARDOUS WASTE AND/OR METALLIC SCRAP

[75] Inventor: Jan A. Aune, Langhus, Norway

[73] Assignee: Elkem Technology a/s, Norway

[21] Appl. No.: 199,243

[22] Filed: May 26, 1988

[30] Foreign Application Priority Data

Mar. 29, 1988 [NO] Norway .................................. 881415

[51] Int. Cl.⁴ .............................................. F23G 5/00
[52] U.S. Cl. .................................. 110/346; 110/165 R; 110/165 A; 110/210; 110/216; 110/259; 110/341

[58] Field of Search ................ 110/259, 165 R, 165 A, 110/203, 210, 211, 216, 341, 346

[56] References Cited

U.S. PATENT DOCUMENTS

| 4,019,444 | 4/1977 | Kleeberg et al. | 110/259 X |
| 4,665,841 | 5/1987 | Kish | 110/234 |
| 4,669,397 | 6/1987 | Galgawa et al. | 110/259 |

Primary Examiner—Edward G. Favors
Attorney, Agent, or Firm—Lucas & Just

[57] ABSTRACT

A method of treating ash and dust from incineration plants. The ash and dust are coprocessed by mixing one or more hazardous wastes and/or metallic scraps therewith. The mixture is supplied to a smelting furnace together with a reducing agent.

13 Claims, 2 Drawing Sheets

FIG. I.

TREATING ASH AND DUST FROM INCINERATION PLANTS BY COPROCESSING WITH HAZARDOUS WASTE AND/OR METALLIC SCRAP

The present to a method for treating ash and dust from incineration plants by coprocessing the ash and dust with one or more specific listed hazardous wastes and/or metallic scraps. More particularly the invention relates to a method of treating ash and dust obtained from incineration of municipal and hazardous waste in order to detoxify and transform the waste products from such plants into such a form that they can be deposited without danger of environmental pollution, and at the same time destruct one or more specific listed hazardous wastes and recover valuable components from the wastes.

By "specific listed" hazardous waste is meant any waste which is listed as hazardous by the authorities.

Ash and dust recovered from incineration plants for municipal and hazardous wastes contain mostly metal oxides and other inorganic oxides. Normally they contain metal oxides of practically all commonly used metals, such as for example oxides of Fe, Ni, Cd, Hg, Zn, Pg, Sn, Cr, Ti and others. The content of the metal oxides may vary strongly with time and from plant to plant. Due to the varying composition and the varying amounts of the metal oxides in the ash and dust it is very difficult to recover the valuable metals. Some of the elements which are usually present in the ash and dust from incineration plants are leachable, such as for example lead, cadmium and chromium. If the ash and dust from the incineration plants are deposited in landfills, the leachable elements may in the course of time be leached from the dust which can result in serious pollution of the environment. Due to the complexity and the low and variable content of valuable materials of the ash and dust from incineration plants, there are at present no economically viable method known to the inventors by which the ash and dust can be treated in such a way that it can be deposited without danger of environmental pollution and at the same time recover valuable components from the wastes.

Further there is an increasingly need for methods for destruction of specific listed hazardous wastes capable of destroying different kinds and combination of specific listed hazardous wastes without pollution of the environment. Many specific listed hazardous wastes contain metal values which in the known destroying processes cannot be recovered. Examples of specific hazardous wastes of this kind are combined organic/inorganic wastes such as PCB-contaminated electrical components which contain copper, dust obtained from the waste gases in production of steel in electric arc furnaces (called EAF dust) which contains high amounts of metal oxides of zinc, lead, cadmium and others, slugdes from the plating industry which contain chromium, nickel, tinn, zinc and others, paint industry waste containing zinc, lead and titanium, flue dust from the non-ferrous metal industry containing copper, nickel, chromium, arsen, manganese etc., and lead-accumulators.

All these specific listed hazardous wastes thus contain valuable metal components which today are normally not recovered to any appreciable extent in the existing disposal processes.

It is an object of the present invention to provide a method for treating ash and dust from incineration plants, especially ash and dust from incineration of municipal and/or hazardous waste in order to detoxify and transfer the ash and dust into such a form that it can be deposited without danger of environmental pollution and recover one and more of the valuable components from the wastes and in the same method destruct one or more specific listed hazardous wastes and recovering one or more of the valuable components contained in the wastes.

It is further an object of the present invention to recover one or more of the valuable components contained in the waste products in the form of directly saleable products, such as for example pure metals or metal alloys having such a chemical composition that they satisfy the requirements normally set to the metals and alloys in question.

According to the present invention, there is provided a method for treatment of ash and dust from incineration plants, especially from incineration of municipal and/or hazardous wastes, in order to transfer the ash and the dust into a form which can be deposited without danger of environmental pollution, coprocessing the ash and dust with one or more specific listed hazardous wastes, the method comprising:
   (a) continuously or intermittently determining the chemical composition of the ash and dust,
   (b) combining the ash and dust with one or more specific listed hazardous wastes to enrich the resulting mixture with respect to one or more recoverable valuable components,
   (c) continuously or intermittent supplying of the mixture to a gastight electrothermic smelting furnace together with a reducing agent and optionally a flux or fluxes,
   (d) smelting and selectively reducing one or more metal compounds in the mixture to metallic form and volatilation of volatile metals and organic components,
   (e) continuously or intermittently tapping of an inert slag phase and a liquid metal and/or matte phase from the smelting furnace,
   (f) continuously removing from the smelting furnace of a waste gas phase containing CO-gas, metal fumes, other volatile inorganic and/or organic components and entrained and unreacted ash and dust from the mixture supplied to the smelting furnace,
   (g) optionally selectively condensing of one or more metals from the metal fumes in the waste gas from the smelting furnace,
   (h) conducting controlled afterburning of oxidisable components in the waste gas at a temperature of 800° to 2000° C. and for a sufficient time to destruct organic components in the waste gas,
   (i) removing dust from the waste gas and recycling the dust to the smelting furnace and/or treating the dust to produce a saleable product.
   (j) purification and neutralization of the waste gas.

According to a further embodiment of the present invention one or more metallic scraps are added to the smelting furnace in order to increase the concentration of the valuable recoverable components in the mixture supplied to the smelting furnace and to obtain metals and alloys fullfilling th requirements which are normally set to such metals and alloys.

The flux or fluxes added in step (c) may according to the composition of the mixture supplied to the smelting furnac, be both acid and alkaline As acid flux a reasonable highgrade SiO2-source is used and as a alkaline flux a reasonable high grade CaO and/or MgO-source are used. The kind and the amount of flux added should be selected and adjusted so that the actual smelting temperature obtained results in a satisfactorily low viscosity of the produced slag, so that the slag can be tapped from the smelting furnace, and when it cooled, shows a microstructure which results in non-leachability.

As the composition of the mixture supplied to the smelting furnace will vary considerably, the amount of flux required will also vary. The kind and the amount of flux to be added must therefore be determined on the basis of the chemical composition of the mixture actually supplied to the smelting furnace.

The temperature in the smelting furnace is preferably maintained within the range of 1200° to 1800° C. and more preferably within the range of 1300° to 1500° C.

If the waste gas from the smelting furnace contains more than one metal fume in such an amount that the metal can be economically recovered by condensation, the metals are selectively condensed in condencers connected in series.

In the controlled afterburner step h) any organic components in the gas is destructed. In the afterburner the temperature is kept at 800° to 2000° C. for up to two seconds in order to ensure complete destruction of organic compounds.

The dust can be removed from the waste gases both by dry-filtering and by wet cleaning. If the waste gas after the controlled afterburning step still contain high amounts of components which condense at lower temperature such as metal chlorides, the waste gas are subjected to wet cleaning. The wet cleaning is conducted by known technichs preferably in a venturi scrubber. The water from the venturi scrubber is forwarded to a thickener to remove the solid material. The solid material is preferably returned to the smelting furnace after filtering and drying, and the water is subjected to a cooling and cleaning step before the major part of the water is returned to the venturi scrubber and a minor part is bleeded out of the system and detoxified.

The cleaned waste gas from the venturi scrubber is continually analyzed for toxic components before it is exhausted through a stack.

If the gas is subjected to dry filtering th gas is first cooled in a gas cooler before it is forwarded to the dry filtering step, preferably a bag filter, where any dust comtained in the gas is removed. The gas leaving the bag filter is then continuously analyzed for toxic components before it is exhausted through a stach. The dry dust from the bag filter can either be returned to the smelting furnace or it can be further processed into a saleable product.

If metal fumes are condensed to recover valuable metals, entrained and unreacted dust and will normally deposit as a dross on the top of the metal bath in the condensers. The dross is removed from the condensers from time to time and is returned to the smelting furnace preferably after a wet-cleaning process for removing water soluble components such as water soluble chlorides from the dust.

The main advantages of the method of the present invention are as follows:

The method can be used to process dust and ash from incineration plants in an economical viable way.

The method can be used to destruct combined organic/inorganic wastes and to recover valuable materials from such wastes.

The method can be used to process practically any combination of dust and ash from incineration plants and specific listed hazardous wastes.

The ash and dust from the incineration plants can be combined with one or more specific listed hazardous wastes in such a way that the concentration of recoverable valuable components in the waste products are increased. This implies that a certain ash and dust quality and a certain specific listed hazardous waste both containing too low consentrations of valuably components in order to economically recover these values if the ash and dust and the high-range hazardous waste are treated in separate processes according to the known state of art, by the coprocessing of the ash and dust and the specific listed hazardous waste according to the method of the present invention, is made possible to recover the valuable components in a simple and economic favourable way. Moreover by adding scrap-metals to the smelting furnace it is possible to produce directly saleable metals or metal alloys in the smelting furnace and to increase the content of a volatile metal in the waste gas from the smelting furnace to such a concentration that the metal fume can be economically recovered by condensation.

Figure 2:
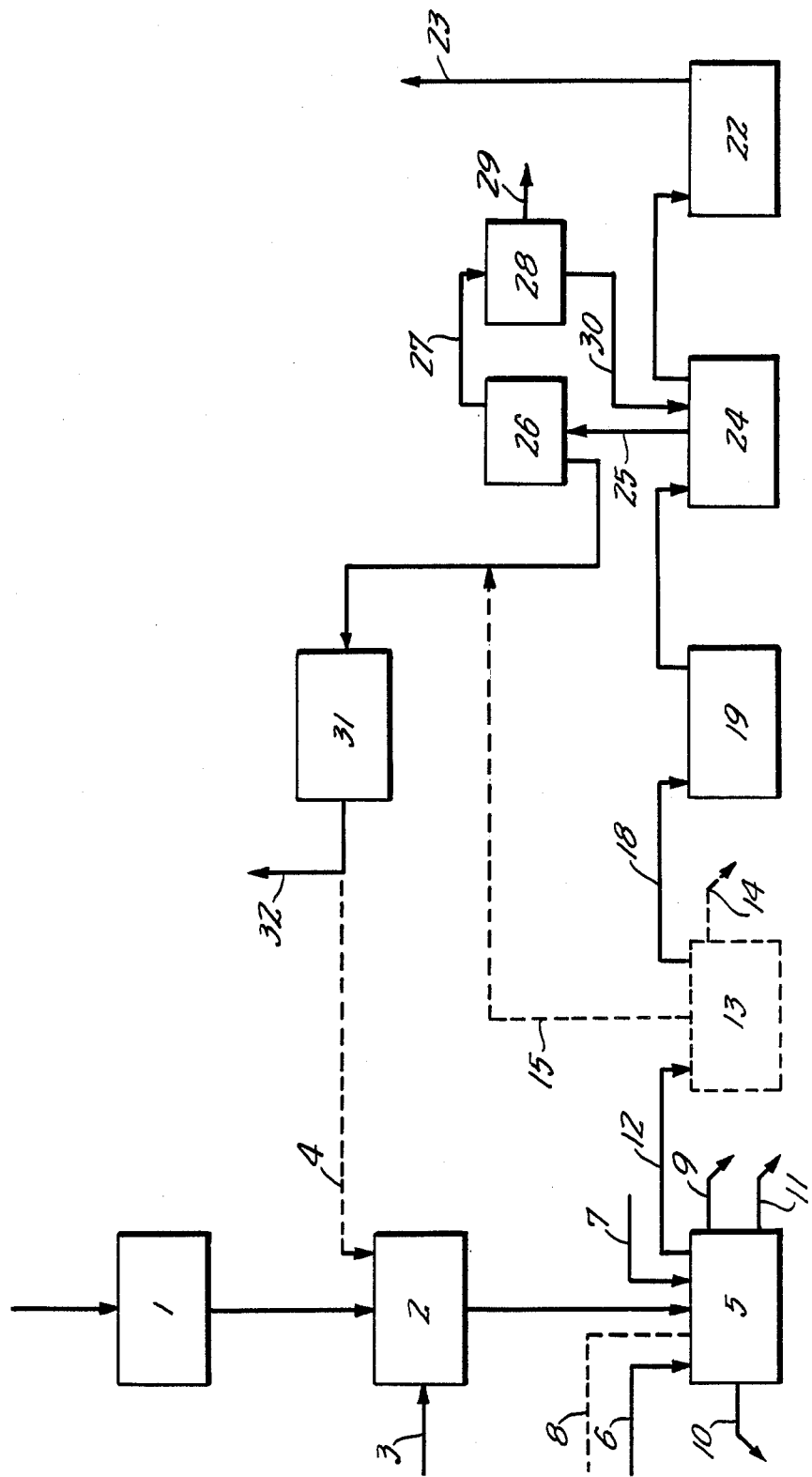

The invention may be carried into practice in a number of various ways and two specific methods will now be described by way of example, with reference to the accompanying drawings in which:

FIG. 1 is a flow diagram illustrating one method in accordance with the present invention, and FIG. 2 is a flow diagram illustrating a second method in accordance with the present invention.

According to the embodiment which is shown in FIG. 1, the chemical composition of an ash and dust from an incineration plant is determined at 1. The ash and dust is forwarded to a mixing step 2 where the ash and dust is mixed with one ore more specific listed hazardous wastes supplied at 3. The amount and the composition of the specific listed hazardous wastes are chosen in order to enrich the resulting mixture with respect to the valuable components to be recovered in the process, and in order to design and balance the mixture both to achieve a saleable product and a detoxified depositable slag product in the process.

Thus if the dust and ash for example has a rather high content of zinc oxide, iron oxide and nickel oxide, the dust and ash is mixed with a one or more specific listed hazardous waste containing appreciable amounts of the zinc and nickel. Optionally recycled dust from the process is also added at 4 to the mixture in step 2.

The final mixture is now continuously or intermittently supplied to a gastight electrothermic smelting furnace 5 together with a reducing agent 6 and optionally one or more fluxes 7. Instead of supplying the reducing agent and the fluxed directly to the smelting furnace they can be mixed with the wastes in the mixing step 2.

In order to increase the value of the recoverably products Ni and Zn, scrap metal, for example Ni-scrap may be added to the smelting furnace at 8.

The mixture is now smelted in the smelting furnace and then the supply of reducing agent is adjusted in order to reduce part of the iron oxide, the nickel oxide and all metal oxides which are more easy to reduce than nickel oxide, to metals. All the volatile metals, such as for example zinc, will be volatilized and the reduced iron and nickel will form a liquid metallic phase of ferronickel. The unreduced metal oxides together with other components will form a slag phase.

The slag phase is continuously or intermittently tapped from the smelting furnace at 9 and cooled. This slag will be inert and can be disposed off without causing any pollution.

The liquid metal or metal alloy phase, for example ferronickel is tapped from the furnace at 10 and sold as high grade metals and alloys, for example high-grade ferronickel.

Optionally a second liquid metallic phase, for example a matte is produced in the smelting furnace and can be tapped from time to time at 11.

The waste gas from the smelting furnace containing metal fumes, other oxidisable organic and inorganic compounds and unreacted dust is continuously withdrawn from the smelting furnace at 12.

If this waste gas contains high enough concentration of one or more metal fumes, for example zinc fume, the gas is forwarded to one or more condensers 13 for condensing of the metal fumes. The liquid metals are tapped form the condensers at 14. In the condensers there will normally be deposited a dross containing unreacted dust and other components. This dross is removed form the condensers at 15 and are either returned to the process at 16, preferably after washing and drying, or the dross are bleeded out for further processing at 17.

The gas is withdrawn form the condensers at 18 and forwarded to an afterburner 19 wherein the oxidizable components in the waste gas is burned at a high temperature and for a sufficient time in order to ensure breakdown of organic components in the waste gas.

The waste gas is thereafter subjected to dry cleaning in a bag filter 20 where dust is removed form the gas. The dust leaves the bag filter at 21 and is either returned to the mixing step 2 or is disposed off.

The clean gas is now forwarded to a unit 22 where the gas undergoes a final purification and neutralisation before it is exhausted at 23.

The embodiment of the invention which is illustrated in the flow-diagram of FIG. 2, differs form that of FIG. 1 in the fact that the cleaning of the gases leaving the afterburner are conducted by wet cleaning. Steps in FIG. 2 which correspond to steps in FIG. 1 are indicated by the same referance numerals.

After the controlled afterburner step 19 the gas is subjected to a wet gas cleaning step 24, preferably a venturi scrubber. The water containing the collected dust is pumped at 25 to a thickener 26. The overflow from the thickener 26 is pumped at 27 to a gas cooling and cleaning apparatus 28. A part of the cleaned water is bleeded of from the gas cooling and cleaning apparatus at 29, while the greater part of the water is recycled to the wet gas cleaning step 24 at 30.

The underflow form the thickener 26 containing the solids is forwarded to a drying step 31, preferably, a rotary kiln where the solids are dried, whereafter they are disposed of at 32 or returned to the mixing step 2.

The clean waste gas from the wet gas cleaning apparatus 24 is forwarded to a unit 22 which is identical to the unit 22 of FIG. 1 where the gas undergoes a final purification and neutralisation before it is exhausted at 23. The dross 15 from the condensers 13 are after washing combined with the solids from the thichener 26 and dried in the dryer unit 31.

It should be clear that the method of the present invention may be carried into practice in a lot of different ways and that the different steps in the gas-cleaning of the waste gas from the afterburner can be changed in order to remove different compounds from the gas. Such gas cleaning steps are well known per si.

I claim:

1. A method for treatment of ash and dust from incineration plants, especially from incineration of municipal and/ or hazardous wastes, in order to transfer the ash and the dust into a form which can be deposited without danger of environmental pollution, coprocessing the ash and dust with on or more specific listed hazardous wastes, the method comprising:
   (a) continuously or intermittently determining the chemical composition of the ash and dust,
   (b) combining the ash and dust with one or more specific listed hazardous wastes to enrich the resulting mixture with respect to one or more recoverable valuable components,
   (c) continuously or intermittent supplying of the mixture to a gastight electrothermic smelting furnace together with a reducing agent and optionally a flux or fluxes,
   (d) smelting and selectively reducing one or more metal compounds in the mixture to metallic form and volatilation of volatile metals and organic components,
   (e) continuously or intermittently tapping of an inert slag phase and a liquid metal and/or matte phase from the smelting furnace,
   (f) continuously removing from the smelting furnace of a waste gas phase containing CO-gas, metal fumes, other volatile inorganic and/or organic components and entrained and unreacted ash and dust from the mixture supplied to the smelting furnace,
   (g) optionally seletively condensing of one or more metals from the metal fumes in the waste gas from the smelting furnace,
   (h) conducting controlled afterburning of oxidisable components in the waste gas at a temperature of 800° to 2000° C. and for a sufficient time to destruct organic components in the waste gas,
   (i) removing dust form the waste gas and recycling the dust to the smelting furnace and/or treating the dust to produce a saleable product.
   (j) purification and neutralization of the waste gas.

2. A method as claimed in claim 1, characterised in that one or more metallic scraps are added to the smelting furnace in order to increase the concentration of the valuable recoverably components in the mixture supplied to the smelting furnace.

3. A method as claimed in claim 1 characterised in that a SiO2-source is added as a flux in step (c).

4. A method as claimed in claim 1 characterised in that a CaO and/or MgO-source is added as a flux in step (c).

5. A method as claimed in claim 1 characterised in that the temperature in the smelting furnace is kept between 1200° and 1800° C.

6. A method as claimed i claim 5, characterised in that the temperature in the smelting furnace is kept between 1300° and 1500° C.

7. A method as claimed in claim 1, characterized in that the gas is kept at a temperature between 800° and 2000° C. for up to two seconds in the afterburner.

8. A method as claimed in claim 1, characterized in that dust is removed from the waste gas in a bag filter.

9. A method as claimed in claim 1, characterized in that the dust is removed from the waste gas in a venturi scrubber.

10. A method as claimed in claim 2, characterized in that a SiO2-source is added as a flux in step (c).

11. A method as claimed in claim 2, characterized in that a CaO and/or MgO-source is added as a flux in step (c).

12. A method as claimed in claim 2, characterized in that the temperature in the smelting furnace is kept between 1200° and 1800° C.

13. A method as claimed in claim 12, characterized in that the temperature in the smelting furnace is kept between 1300° and 1500° C.

* * * * *